United States Patent [19]
Wolken

[11] Patent Number: 5,778,547
[45] Date of Patent: Jul. 14, 1998

[54] ELECTRONIC COMBINATION SQUARE

[76] Inventor: Kerry D. Wolken, 836 S. Barnett, Anaheim, Calif. 92805

[21] Appl. No.: 735,796

[22] Filed: Oct. 21, 1996

[51] Int. Cl.$^6$ ...................................... G01B 7/02
[52] U.S. Cl. .............................. 33/427; 33/476; 33/479; 33/708
[58] Field of Search .................. 33/1 M, 42, 418, 33/419, 427, 474, 476, 478, 479, 480, 706, 708, 452, 464, 784

[56] References Cited

U.S. PATENT DOCUMENTS

| | | | |
|---|---|---|---|
| 2,875,524 | 3/1959 | Bower et al. | 33/708 |
| 4,578,868 | 4/1986 | Sasaki et al. | 33/706 |
| 4,599,805 | 7/1986 | Padilla | 33/479 |
| 4,641,435 | 2/1987 | Brown | 33/427 |
| 4,854,049 | 8/1989 | Kuhtik | 33/427 |
| 5,074,053 | 12/1991 | West | 33/708 |
| 5,131,164 | 7/1992 | Miller | 33/427 |
| 5,148,612 | 9/1992 | Walser et al. | 33/DIG. 1 |
| 5,309,642 | 5/1994 | McGinnis | 33/476 |
| 5,327,653 | 7/1994 | Pistorius et al. | 33/708 |
| 5,337,488 | 8/1994 | Lemelson | 33/784 |
| 5,353,509 | 10/1994 | Black | 33/476 |
| 5,406,715 | 4/1995 | Koizumi et al. | 33/706 |
| 5,471,753 | 12/1995 | Rodrigues | 33/42 |
| 5,488,782 | 2/1996 | Ochiai | 33/708 |

FOREIGN PATENT DOCUMENTS

| | | | |
|---|---|---|---|
| 63-3201 | 1/1988 | Japan | 33/708 |

*Primary Examiner*—G. Bradley Bennett
*Attorney, Agent, or Firm*—Michael I. Kroll

[57] ABSTRACT

An improved electronic combination square (10) comprising an elongate blade (12) constructed of a nonmagnetic material. An elongate conductor strip (14) constructed of a magnetic material is connected longitudinally into a recessed top surface of the blade (12). A head (16) is provided having two ninety degree angle sides (18), (20) and two forty five degree angle sides (22), (24) constructed of a non-magnetic material. A facility (26) is for allowing the head (16) to slide to any position along the blades (12) over the conductor strip (14) from either of the two ninety degree angle sides (18), (20). A structure (28) is for locking the head (16) to the blade (12) from either of the two ninety degree angle sides (18), (20). A component (30) in the head (16) is for actuating a signal magnetically, relative to the position of the head (16) on the conductor strip (14) in the blade (12). An assembly (32) in the head (16) is for outputting a visual representation of a dimension measured by the head (16) in accordance with the signal received from the signal actuating component (30).

20 Claims, 4 Drawing Sheets

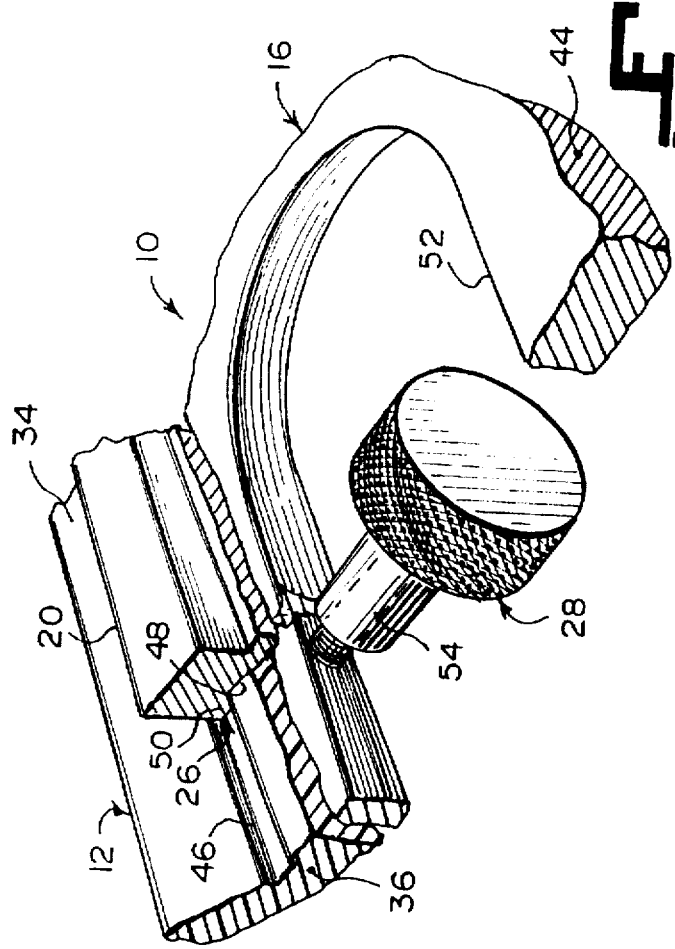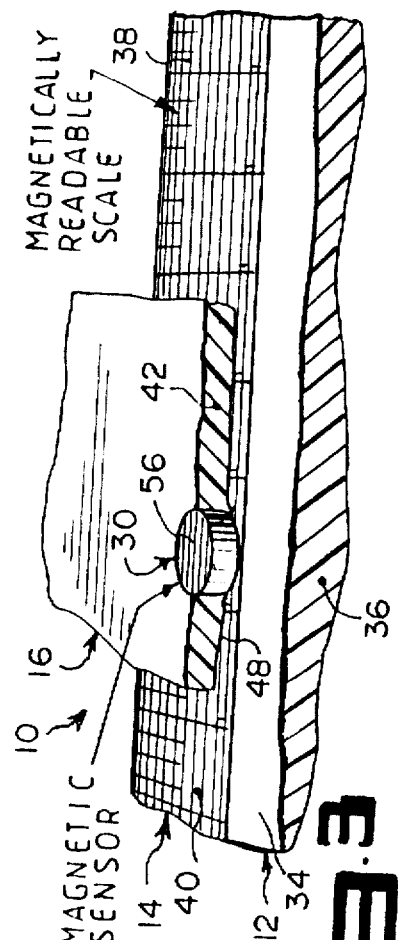

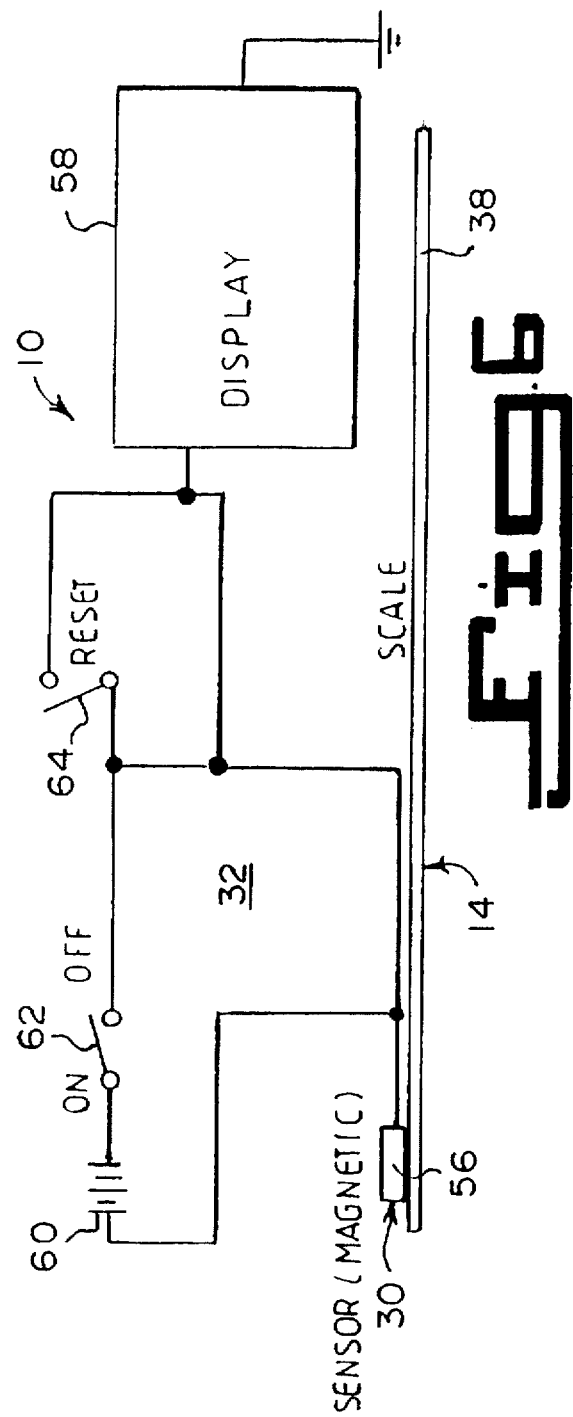

ELECTRONIC COMBINATION SQUARE

BACKGROUND OF THE INVENTION

1. Field of the Invention

The instant invention relates generally to measuring devices and more specifically it relates to an improved electronic combination square.

2. Description of the Prior Art

Numerous measuring devices have been provided in prior art. For example, U.S. Pat. Nos. 5,074,053 to West; 5,148,612 to Walser et al.; 5,337,488 to Lemelson and 5,471,753 to Rodrigues all are illustrative of such prior art. While these units may be suitable for the particular purpose to which they address, they would not be as suitable for the purposes of the present invention as heretofore described.

WEST, JOHN D.

MAGNETICALLY ACTUATED LINEAR POSITION SENSOR

U.S. Pat. No. 5,074,053

A linear sensing device containing an electrically conductive reed strip, which in the presence of an external actuating horseshoe magnet, makes electrical contact to a resistive strip at the location of that magnet. The conductive reed strip is attached along one end to a supporting member, formed from a material with coefficient of thermal expansion similar to the reed strip, to prevent warping of the reed strip over a range of environmental temperatures. The sensing device is of a modular construction with elongate cap, to which the resistive strip is attached, and an elongate base, to which the reed strip support member is attached. The cap and base mate together to form an inner container which then slides into an outer container.

WASLER, CARL S.

JOST, JOHANN M.

APPARATUS FOR MEASURING DISTANCES ON A WORKPIECE, AND SLIDING GAGE DESIGNED FOR THE DIGITAL MEASUREMENT OF SUCH DISTANCES

U.S. Pat. No. 5,148,612

The measuring apparatus consists of a stationary or mobile desk having at least one aligning bar for interaction with at least one of the measuring surfaces of a measuring limb of the sliding gage. At least one measuring surface is outside the plane of a graduated straightedge and at least one of the measuring limbs has two limb parts which project in two different directions from the graduated straightedge parallel to the plane of the latter, and whose two measuring surfaces are in a plane perpendicular to the graduated straightedge. Means for detachably fixing the aligning bar and/or the object to be measured on the desk may be provided. Preferably, both measuring limbs are displaceable on the graduated straightedge, and at least one of the two can be fixed.

LEMELSON, JEROME H.

MEASURING INSTRUMENT AND METHOD

U.S. Pat. No. 5,337,488

A measuring device, such as a micrometer or other form of dimensional measuring instrument, is provided which is operable to indicate dimensional measurements made thereby in numerical form on a display, such as an electronic digital display. The measuring device or micrometer is controlled to generate digital electrical signals which are indicative of a measurement, which signals of each measurement are recorded in an electronic memory which may be supported by the device or connected thereto. The memory is employed to both indicate each measurement as it is made and to record all or selected measurements made for future reference. Other information generated, for example, by a suitable input means such as a keyboard, and defining such variables as part number, part lot, time and date of measurement, etc. may be recorded in such memory along with the recording or recordings of data defining the measurements made.

RODRIGUES, BERNARDO M.

COMBINATION T-SQUARE AND CUTTER

U.S. Pat. No. 5,471,753

A combination T-square and cutter comprising a main segment formed in a long planar rectangular configuration with parallel long side edges and parallel short side edges. The main segment includes a centrally located long rectangular aperture which extends the majority of the length of its long sides. The long side edges of the aperture include an undercut groove. A cross bar is formed in a planar rectangular configuration with parallel short edges and parallel long edges. The central portion of the bar is coupled to the lower surface of the main segment. A slide base is formed in a planar rectangular configuration with parallel long edges, parallel short edges, an upper surface and a lower surface. The short edges of the base are adapted to fit within the grooves in the aperture of the main segment. The base includes a coupling device on its upper surface. A knife holder is formed in a curved boat-like configuration with upwardly extending side walls, one large open end, one smaller closed end, and an open top portion therebetween. The holder is formed in a downwardly angles configuration with the small end positioned at the lower end. The small end also includes a slot extending from its edge downward a short distance. The holder is positioned upon the slide base and includes a coupling device at its lowermost extent which permits rotation and locking of the holder.

SUMMARY OF THE INVENTION

A primary object of the present invention is to provide an improved electronic combination square that will overcome the shortcomings of the prior art devices.

Another object is to provide an improved electronic combination square that utilizes an electronic digital readout display which will eliminate decimal/fraction conversion and is accurate to within one thousandth (0.001) of an inch.

An additional object is to provide an improved electronic combination square that can perform work of a traditional square, plus it can double as a depth micrometer, while when utilizing a second blade, it will allow measurement along two planes, as well as being more versatile for reaching into or across different objects.

A further object is to provide an improved electronic combination square that is simple and easy to use.

A still further object is to provide an improved electronic combination square that is economical in cost to manufacture.

Further objects of the invention will appear as the description proceeds.

3

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 2 is an enlarged perspective view of the area indicated by arrow 2 in FIG. 1, with parts broken away and in section.

FIG. 3 is a cross section perspective view taken along line 3—3 in FIG. 1.

FIG. 6 is a diagrammatic view of the electrical circuitry of the instant invention.

Similar reference characters denote corresponding features consistently throughout the attached drawings.

DETAILED DESCRIPTION OF THE PREFERRED EMBODIMENTS

Figure 1:
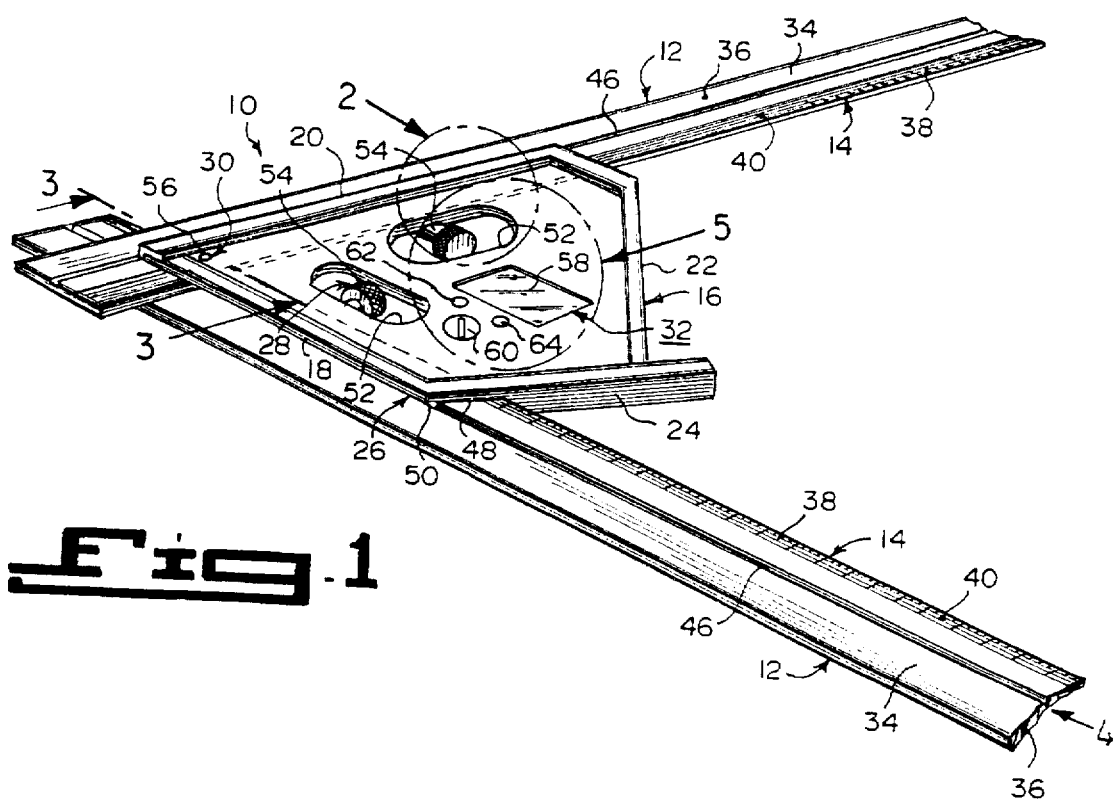
FIG. 1 is a perspective view of the instant invention.
Figure 4:
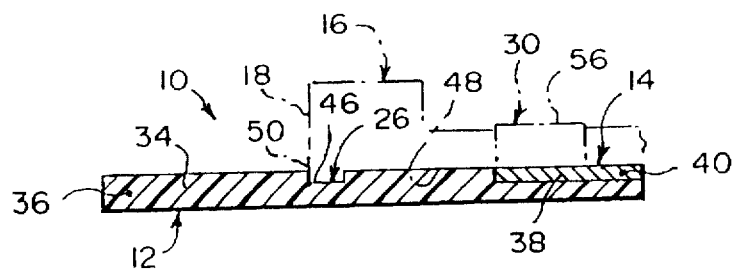
FIG. 4 is an enlarged end view in cross section of one of the blades as indicated by arrow 4 in FIG. 1, with a portion of the head and magnetic sensor in phantom.
Figure 5:
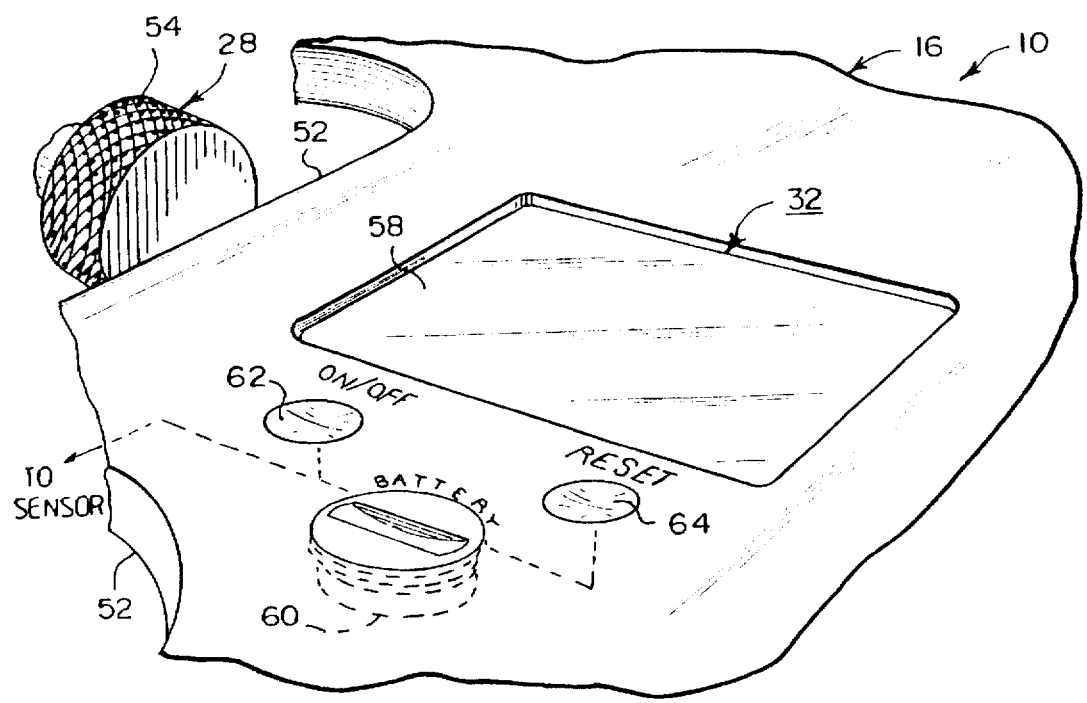
FIG. 5 is an enlarged perspective view of the area indicated by arrow 5 in FIG. 1.

Turning now descriptively to the drawings, in which similar reference characters denote similar elements throughout the several views, FIGS. 1 to 6 illustrate an improved electronic combination square 10 comprising an elongate blade 12 constructed of a non-magnetic material. An elongate conductor strip 14 constructed of a magnetic material is connected longitudinally into a recessed top surface of the blade 12. A head 16 is provided having two ninety degree angle sides 18, 20 and two forty five degree angle sides 22, 24, constructed of a non-magnetic material. A facility 26 is for allowing the head 16 to slide to any position along the blade 12 over the conductor strip 14 from either of the two ninety degree angle sides 18, 20.

A structure 28 is for locking the head 16 to the blade 12 from either of the two ninety degree angle sides 18, 20. A component 30 in the head 16 is for actuating a signal magnetically, relative to the position of the head 16 on the conductor strip 14 in the blade 12. An assembly 32 in the head 16 is for outputting a visual representation of a dimension measured by the head 16 in accordance with the signal received from the signal actuating component 30. The blade 12 is a straightedge 34. The non-magnetic material of the blade 12 is a plastic substance 36.

The conductor strip 14 is a scale 38 having graduation marks therealong for reference and backup, in case of damage and error in the visual outputting assembly 32. The magnetic material of the conductor strip 14 is a ferromagnetic substance 40. The non-magnetic material of the head 16, as best seen in FIG. 3, is a plastic substance 42. The non-magnetic material of the head 16, as shown in FIG. 2, is a metal substance 44. In regards to materials, the reference to materials does not limit the possible methods of manufacture or allows another form to be made by substitution of other non-specified materials.

The slide allowing facility 26 includes the blade 12 having a longitudinal groove 46 therein. The head 16 has two bottom notches 48. Each bottom notch 48 is located at each ninety degree angle side 18, 20. Two tongues 50 are provided. Each tongue 50 extends downwardly at a forward end of one bottom notch 48. The blade 12 will transversely fit under one bottom notch 48 with the respective tongue 50 riding within the longitudinal groove 46.

The locking structure 28 consists of the head 16 having two openings 52 therein. Each opening 52 is located adjacent each ninety degree angle side 18, 20. Two clamping screws 54 are provided. Each clamping screw 54 is within one opening 52 and threads through the head 16, to engage with an edge of the blade 12 to prevent movement of the head 16. The signal actuating component 30 is a magnetic sensor 56, electrically connected to the visual outputting assembly 32.

The visual outputting assembly 32 comprises an electronic digital readout display 58. A battery 60 is electrically connected between the signal actuating component 30 and the electronic digital readout display 58. An on/off switch 62 is electrically connected between the battery 60 and the electronic digital readout display 58. A reset switch 64 is electrically connected between the battery 60 and the electronic digital readout display 58.

The invention is an improvement of the traditional combination square generally used by machinists and other tradesmen. Two blades 12 of varying lengths can be used, as well as the traditional use of only one blade 12. One blade 12 must overlap the other blade 12, so that each blade cannot impede the movement of the other blade. Both blades 12 must be perpendicular within one thousandth (0.001) of an inch per one inch of axial travel.

The elongate conductor strip 14 can be on one side or both sides of the blade 12. The graduation marks can be in inches, metric or a combination of both, cannot interfere with the magnetic sensor 56 and must be accurate to industry standards.

LIST OF REFERENCE NUMBERS 10 improved electronic combination square
12 elongate blade of 10
14 elongate conductor strip of 10 in 12
16 head of 10
18 first ninety degree angle side of 16
20 second ninety degree angle side of 16
22 forty five degree angle side of 16
24 second forty five degree angle side of 16
26 slide allowing facility of 10
28 locking structure of 10
30 signal actuating component of 10
32 visual outputting assembly of 10
34 straightedge for 12
36 plastic substance of 12
38 scale for 14
40 ferromagnetic substance of 14
42 plastic substance of 16
44 metal substance of 16
46 longitudinal groove of 26 in 12
48 bottom notch of 26 at 18, 20
50 tongue of 26 at 48
52 opening of 28 in 16
54 clamping screw of 28 in 52
56 magnetic sensor for 30

58 electronic digital readout display of 32
60 battery of 32
62 on/off switch of 32
64 reset switch of 32

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved electronic combination square comprising:
   a) an elongate blade constructed of a nonmagnetic material;
   b) an elongate conductor strip constructed of a magnetic material connected longitudinally into a recessed top surface of said blade;
   c) a head having two ninety degree angle sides and two forty five degree angle sides, constructed of a non-magnetic material;
   d) means for allowing said head to slide to any position along said blade over said conductor strip from either of said two ninety degree angle sides;
   e) means for locking said head to said blade from either of said two ninety degree angle sides;
   f) means in said head for actuating a signal magnetically, relative to the position of said head on said conductor strip in said blade; and
   g) means in said head for outputting a visual representation of a dimension measured by said head in accordance with the signal received from said signal actuating means.

2. An improved electronic combination square as recited in claim 1, wherein said blade is a straightedge.

3. An improved electronic combination square as recited in claim 1, wherein said non-magnetic material of said blade is a plastic substance.

4. An improved electronic combination square as recited in claim 1, wherein said conductor strip is a scale having graduation marks therealong for reference and backup in case of damage and error in said visual outputting means.

5. An improved electronic combination square as recited in claim 1, wherein said magnetic material of said conductor strip is a ferromagnetic substance.

6. An improved electronic combination square as recited in claim 1, wherein said non-magnetic material of said head is a plastic substance.

7. An improved electronic combination square as recited in claim 1, wherein said non-magnetic material of said head is a metal substance.

8. An improved electronic combination square as recited in claim 1, wherein said slide allowing means includes:
   a) said blade having a longitudinal groove therein;
   b) said head having two bottom notches, each said bottom notches located at each said ninety degree angle side; and
   c) two tongues, each said tongue extends downwardly at a forward end of said bottom notch, whereby said blade will transversely fit under one said bottom notch with said respective tongue to ride within said longitudinal groove.

9. An improved electronic combination square as recited in claim 1, wherein said locking means includes:
   a) said head having two openings therein, each said opening located adjacent each said ninety degree angle side; and
   b) two clamping screws, each said clamping screw within one said opening and threads through said head to engage with an edge of said blade to prevent movement of said head.

10. An improved electronic combination square as recited in claim 1, wherein signal actuating means is a magnetic sensor electrically connected to said visual outputting means.

11. An improved electronic combination square as recited in claim 1, wherein said visual outputting means includes:
   a) an electronic digital readout display;
   b) a battery electrically connected between said signal actuating means and said electronic digital read out display;
   c) an on/off switch electrically connected between said battery and said electronic digital readout display; and
   d) a reset switch electrically connected between said battery and said electronic digital readout display.

12. An improved electronic combination square comprising:
   a) an elongate blade constructed of a nonmagnetic material;
   b) an elongate conductor strip constructed of a magnetic material connected longitudinally into a recessed top surface of said blade;
   c) a head having two ninety degree angle sides and two forty five degree angle sides, constructed of a non-magnetic material;
   d) means for allowing said head to slide to any position along said blade over said conductor strip from either of said two ninety degree angle sides;
   e) means for locking said head to said blade from either of said two ninety degree angle sides;
   f) means in said head for actuating a signal magnetically, relative to the position of said head on said conductor strip in said blade, wherein signal actuating means is a magnetic sensor electrically connected to said visual outputting means; and
   g) means in said head for outputting a visual representation of a dimension measured by said head in accordance with the signal received from said signal actuating means, wherein said visual out putting means includes an electronic digital readout display, a battery electrically connected between said signal actuating means and said electronic digital readout display, an on/off switch electrically connected between said battery and said electronic digital readout display and a reset switch electrically connected between said battery and said electronic digital readout display.

13. An improved electronic combination square as recited in claim 12, wherein said blade is a straightedge.

14. An improved electronic combination square as recited in claim 13, wherein said non-magnetic material of said blade is a plastic substance.

15. An improved electronic combination square as recited in claim 14, wherein said conductor strip is a scale having graduation marks therealong for reference and backup in case of damage and error in said visual outputting means.

16. An improved electronic combination square as recited in claim 15, wherein said magnetic material of said conductor strip is a ferromagnetic substance.

17. An improved electronic combination square as recited in claim 16, wherein said non-magnetic material of said head is a plastic substance.

18. An improved electronic combination square as recited in claim 16, wherein said non-magnetic material of said head is a metal substance.

19. An improved electronic combination square as recited in claim 16, wherein said slide allowing means includes:

a) said blade having a longitudinal groove therein;

b) said head having two bottom notches, each said bottom notches located at each said ninety degree angle side; and c) two tongues, each said tongue extends downwardly at a forward end of said bottom notch, whereby said blade will transversely fit under one said bottom notch with said respective tongue to ride within said longitudinal groove.

20. An improved electronic combination square as recited in claim 19, wherein said locking means includes:

a) said head having two openings therein, each said opening located adjacent each said ninety degree angle side; and b) two clamping screws, each said clamping screw within one said opening and threads through said head to engage with an edge of said blade to prevent movement of said head.

\* \* \* \* \*